United States Patent
Geleji et al.

(10) Patent No.: US 11,281,681 B2
(45) Date of Patent: *Mar. 22, 2022

(54) MESSAGE PARSER RUNTIME CHOICES

(71) Applicant: INTERNATIONAL BUSINESS MACHINES CORPORATION, Armonk, NY (US)

(72) Inventors: Geza Geleji, Eastleigh (GB); Martin A. Ross, Gosport (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 156 days.

This patent is subject to a terminal disclaimer.

(21) Appl. No.: 16/739,524

(22) Filed: Jan. 10, 2020

(65) Prior Publication Data

US 2020/0151184 A1 May 14, 2020

Related U.S. Application Data

(63) Continuation of application No. 15/405,763, filed on Jan. 13, 2017, now Pat. No. 10,579,629.

(51) Int. Cl.
*G06F 16/2457* (2019.01)
*G06F 16/21* (2019.01)
(Continued)

(52) U.S. Cl.
CPC ...... *G06F 16/24578* (2019.01); *G06F 16/212* (2019.01); *G06F 16/2246* (2019.01);
(Continued)

(58) Field of Classification Search
CPC ........... G06F 16/212; G06F 16/224549; G06F 16/2246; G06F 16/245; G06F 16/24578; H04L 51/063; H04L 69/22
See application file for complete search history.

(56) References Cited

U.S. PATENT DOCUMENTS 6,732,153 B1 5/2004 Jakobson et al.
7,313,567 B1 12/2007 Leung
(Continued)

OTHER PUBLICATIONS

Final Office Action dated Jan. 24, 2020, in U.S. Appl. No. 15/405,816, 52 pages.
(Continued)

*Primary Examiner* — Matthew J Ellis
(74) *Attorney, Agent, or Firm* — Nicholas Bowman; Andrew D. Wright; Roberts Calderon Safran & Cole. P.C.

(57) ABSTRACT

This invention relates to a system, method and computer program product for parsing a message against a message model, the message model including a choice block of element options and guide field for guiding the parse, the method including: parsing a message against a message model until the choice block of element options and associated guide field is located in the message model; determining element options associated with a particular guide field value located in the message, each element option having an associated frequency of occurring within a body of messages; choosing the most frequently occurring element option for the located guide field value; and further parsing the choice block of element options against the chosen element option.

20 Claims, 6 Drawing Sheets

(51) Int. Cl.
  *G06F 16/245* (2019.01)
  *G06F 16/22* (2019.01)
  *H04L 51/063* (2022.01)
  *G06F 16/2453* (2019.01)
  *H04L 69/22* (2022.01)

(52) U.S. Cl.
  CPC .......... *G06F 16/245* (2019.01); *H04L 51/063* (2013.01); *G06F 16/24549* (2019.01); *H04L 69/22* (2013.01)

(56) References Cited

U.S. PATENT DOCUMENTS

| | | | |
|---|---|---|---|
| 7,362,909 | B2 | 4/2008 | Watanabe et al. |
| 7,508,985 | B2 | 3/2009 | Van Lunteren |
| 7,870,295 | B2 | 1/2011 | Johnson |
| 8,484,230 | B2 | 7/2013 | Harnett et al. |
| 8,522,255 | B2 | 8/2013 | Kaiser |
| 8,555,262 | B2 | 10/2013 | Harnett et al. |
| 8,626,624 | B2 | 1/2014 | Parsons et al. |
| 8,719,353 | B2 | 5/2014 | Park et al. |
| 8,880,557 | B2 * | 11/2014 | Takase ................ G06F 16/2246 707/797 |
| 8,903,718 | B2 | 12/2014 | Akuwudike |
| 8,918,373 | B2 | 12/2014 | Cheriyath et al. |
| 9,131,000 | B2 | 9/2015 | Iyer |
| 10,339,681 | B2 * | 7/2019 | Moore ...................... G06F 8/34 |
| 2002/0097715 | A1 | 7/2002 | Roerick |
| 2003/0120737 | A1 | 6/2003 | Lytle et al. |
| 2004/0186920 | A1 | 9/2004 | Birdwell et al. |
| 2004/0205717 | A1 * | 10/2004 | Chiang ................. G06F 11/362 717/124 |
| 2005/0289525 | A1 * | 12/2005 | David ..................... G06F 8/427 717/143 |
| 2005/0289526 | A1 * | 12/2005 | Wang ........................ G06F 8/10 717/144 |
| 2007/0044069 | A1 * | 2/2007 | Doucette .................. G06F 8/41 717/106 |
| 2007/0130178 | A1 | 6/2007 | Kimura |
| 2007/0226754 | A1 | 9/2007 | Grabamik et al. |
| 2008/0059577 | A1 * | 3/2008 | Kalia ..................... G06Q 10/10 709/204 |
| 2009/0049007 | A1 | 2/2009 | Kimber |
| 2009/0285112 | A1 | 11/2009 | Lee et al. |
| 2010/0131922 | A1 * | 5/2010 | Shenfield ................. G06F 8/20 717/107 |
| 2012/0197914 | A1 * | 8/2012 | Harnett ................ G06F 16/332 707/755 |
| 2012/0254262 | A1 | 10/2012 | Belisario et al. |
| 2013/0086069 | A1 | 4/2013 | Phillips |
| 2014/0007050 | A1 * | 1/2014 | Belisario ................ G06F 9/451 717/113 |
| 2014/0230006 | A1 | 8/2014 | Burke et al. |
| 2014/0350964 | A1 * | 11/2014 | Rhodes .................. G16H 40/20 705/3 |
| 2015/0161098 | A1 | 6/2015 | Granshaw et al. |
| 2015/0186504 | A1 | 7/2015 | Gorman et al. |
| 2016/0062954 | A1 * | 3/2016 | Ruff ....................... G06F 40/205 715/249 |
| 2016/0259806 | A1 * | 9/2016 | Kapoor .............. G06K 9/00442 |
| 2017/0091735 | A1 | 3/2017 | Kulpati et al. |
| 2017/0264522 | A1 | 9/2017 | Long |
| 2018/0203695 | A1 | 7/2018 | Geleji et al. |
| 2018/0203858 | A1 | 7/2018 | Geleji et al. |
| 2018/0204130 | A1 | 7/2018 | Geleji et al. |

OTHER PUBLICATIONS

Office Action dated Jun. 1, 2020 in U.S. Appl. No. 15/405,816, 40 pages.
Office Action dated May 13, 2021 in related U.S. Appl. No. 15/405,816, 20 pages.
IBM Knowledge Center, "Data Format Description Language (DFDL) v1.0 Specification", http://www.ibm.com/support/knowledgecenter/SSMKHH_10.0.0/com.ibm.dfdl.spec.doc/dfdl_index.htm, Accessed Dec. 8, 2016, 127pages.
"XML Schema Choice Element", w3schools.com, https://web.archive.org/web/20160406203106/http://www.w3schools.com, Accessed Dec. 8, 2016, 5 pages.
Boer et al., "Combining Monitoring with Run-Time Assertion Checking", http://envisage-project.eu/wp-content/uploads/2015/02/frank_stijn_sfm.pdf, Accessed Dec. 9, 2016, 48 pages.
List of IBM Patents or Patent Applications Treated as Related, dated Jan. 10, 2020, 1 page.
Office Action dated Nov. 20, 2020, in U.S. Appl. No. 15/405,816, 46 pages.
Final Office Action dated Aug. 30, 2021 in related U.S. Appl. No. 15/405,816, 23 pages.

* cited by examiner

Parsing Optimizer 200

- Background Parser 202
- Element Options Fetcher 204
- Element Option Chooser 206
- Option Parser 208
- Message Tree Populater 210
- Element Option Frequency Updater 212
- Guide Field Value Element Option Tables 214
- Enhanced Message Models 216
- Parsing Optimizer Method 300

FIG. 2

```
1  Message :: Message01 sequence {
2    fieldX :: string
3    fieldY :: int
4    fieldZ :: string
5    option (guide_field=/fieldY){
6     complexA {
7       fieldAA :: byte
8       fieldAB :: string
9       fieldAC :: double
10      fieldAD :: string}
11    complexB {
12      fieldBA :: byte
13      fieldBB :: string
14      fieldBC :: string
15      fieldBD :: string}
16    complexC {
17      fieldCA :: string
18      fieldCB :: double
19      fieldCC :: double
20      fieldCD :: string}
21    complexD {
22      fieldDA :: byte
23      fieldDB :: int
24      fieldDC :: byte
25      fieldDD :: string}
26   }
```

FIG. 4

Stage 5A1 Message A: string; 7; string; string; double; double; string; .....

| Stage 5A2 Option element frequency table for guide field y=7 ||
|---|---|
| Option element | Frequency |
| Complex A | 0 |
| Complex B | 0 |
| Complex C | 0 |
| Complex D | 0 |

Stage 5A3 Option Elements have same probability.

Stage 5A4 Parse Cycle takes 3 cycles for complex A; B and C to successfully parse option element C.

Stage 5A5 Complex C frequency incremented from 0 to 1 in Option Element Frequency Table.

| Stage 5A6 Option element frequency table for guide field y=7 ||
|---|---|
| Option element | Frequency |
| Complex A | 0 |
| Complex B | 0 |
| Complex C | 1 |
| Complex D | 0 |

FIG. 5A

Stage 5B1 Message B "string; 7; string; string; double; double; string; ….."

| Stage 5B2 Option element frequency table for guide field y=7 ||
|---|---|
| Option element | frequency |
| Complex A | 0 |
| Complex B | 0 |
| Complex C | 1 |
| Complex D | 0 |

Stage 5B3 Option Element C has highest probability.

Stage 5B4 Parse Cycle takes 1 cycles for complex C to be successfully parsed.

Stage 5B5 Complex C frequency incremented from 1 to 2 in Option Element Frequency Table.

| Stage 5B6 Option element frequency table for guide field y=7 ||
|---|---|
| Option element | Frequency |
| Complex A | 0 |
| Complex B | 0 |
| Complex C | 2 |
| Complex D | 0 |

FIG. 5B

MESSAGE PARSER RUNTIME CHOICES

BACKGROUND

The present invention relates to a method and apparatus for optimizing a messaging parser for making runtime choices when parsing a message against a message model.

Message models provide a method for describing the logical structure of message data. A typical message model may be composed of both simple and complex elements, and either sequences or choices between said elements at different levels within the structure. A choice construct enables a developer to model a message such that a particular element (complex or simple) may be one of a plurality of element types. However, in the case of a choice of complex structures in order for the run-time to parse a message correctly then the run time will parse the structure as each of the plurality of possible structures in turn until it reaches the one that parses correctly. This can lead to excessive parsing and CPU cost.

SUMMARY

In a first aspect of the invention there is provided a system for parsing a message against a message model, the message model comprising a choice block of element options and a guide field value for guiding the parse. The system includes: a processor, a computer readable memory, and a computer readable storage medium associated with a computer device; program instructions of a background parser configured to parse a message against a message model until a choice block of element options and an associated guide field is located in the message model; program instructions of an element option fetcher configured to determine element options associated with a particular guide field value located in the message, each element option having an associated frequency of occurring within a body of messages; program instructions of an element option chooser configured to choose the most frequently occurring element option for the located guide field value; and program instructions of an option parser configured to further parse the choice block of element options against the chosen element option. The program instructions are stored on the computer readable storage medium for execution by the processor via the computer readable memory In a second aspect of the invention there is provided a computer-implemented method for parsing a message against a message model, the message model comprising a choice block of element options and a guide field for guiding the parse, the method comprising: parsing, by a computer device, a message against a message model until a choice block of element options and an associated guide field is located in the message model; determining, by the computer device, element options associated with a particular guide field value in the message, each element option having an associated frequency of occurring within a body of messages; choosing, by the computer device, the most frequently occurring element option for the located guide field value; and further parsing, by the computer device, the choice block of element options against the chosen element option.

Preferably a message is parsed against a message model until a choice block is reached that has an associated guide field to guide the choice of possible options.

In a third aspect of the invention there is provided a computer program product for parsing a message against a message model, the message model comprising a choice block of element options and a guide field for guiding the parse, the computer program product comprising a computer readable storage medium having program instructions embodied therewith, the program instructions executable by a processor to cause the processor to: parse a message against a message model until a choice block of element options and an associated guide field is located in the message model; determine element options associated with a particular guide field value in the message, each element option having an associated frequency of occurring within a body of messages; choose the most frequently occurring element option for the located guide field value; and further parse the choice block of element options against the chosen element option.

BRIEF DESCRIPTION OF THE DRAWINGS

Preferred embodiments of the present invention will now be described, by way of example only, with reference to the following drawings in which:

FIG. 2 is a component diagram of an optimizer in accordance with aspects of the invention;

FIG. 4 is an example message model in accordance with aspects of the invention; and FIG. 5A and FIG. 5B are example parsing stages for messages and corresponding element option tables in accordance with aspects of the invention.

DETAILED DESCRIPTION

Figure 1:
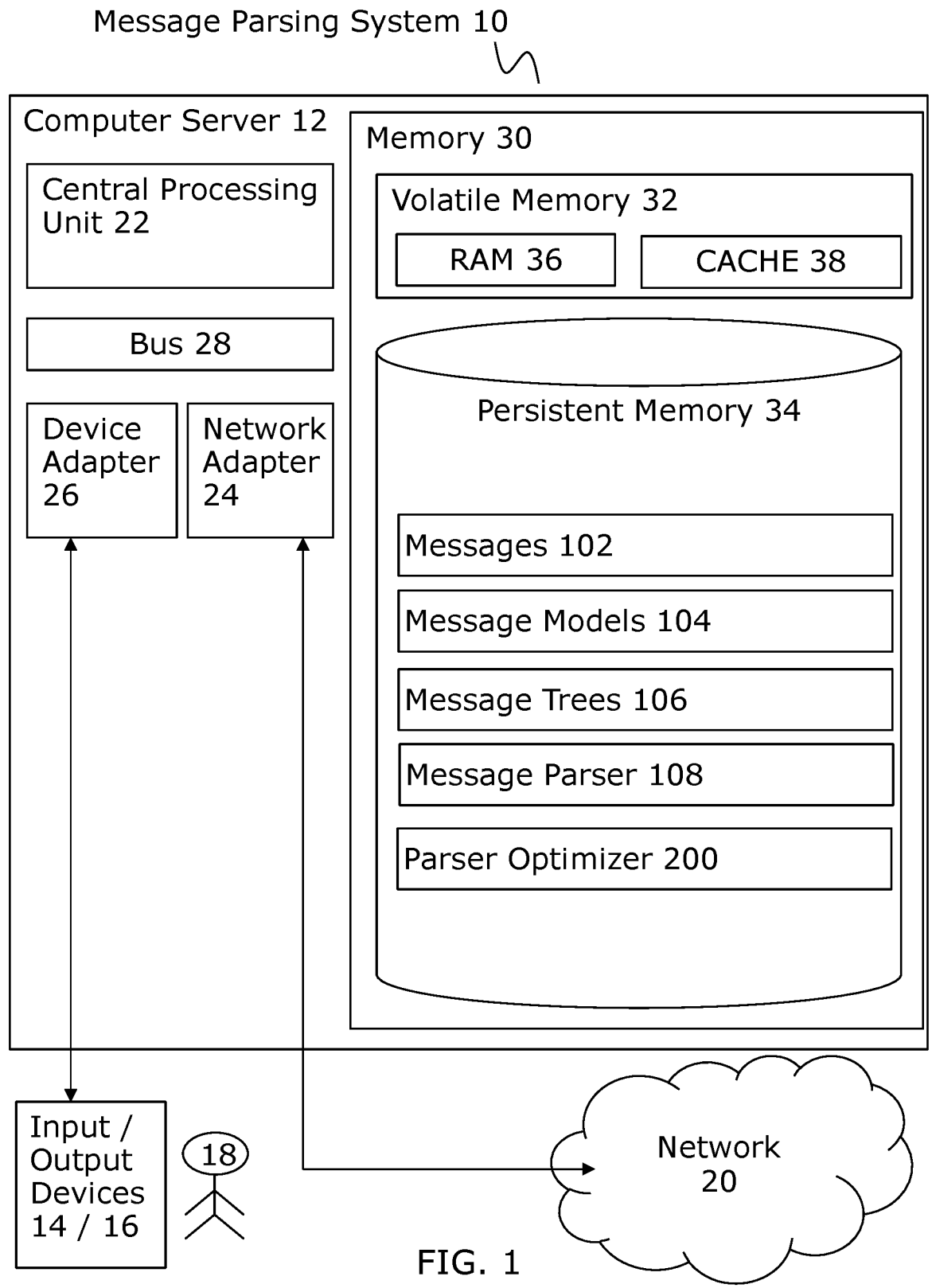
FIG. 1 is a deployment diagram of a system in accordance with aspects of the invention.

Referring to FIG. 1, the deployment of a preferred embodiment in message parsing system 10 is described. Message parsing system 10 is operational with numerous other general purpose or special purpose computing system environments or configurations. Examples of computing processing systems, environments, and/or configurations that may be suitable for use with message parsing system 10 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices. A distributed computer environment includes a cloud computing environment for example where a computer processing system is a third party service performed by one or more of a plurality computer processing systems. A distributed computer environment also includes an Internet of things computing environment, for example, where computer processing systems are distributed as a network of objects that can interact with a computing service.

Message parsing system 10 may be described in the general context of computer system executable instructions, such as program modules, being executed by a computer processor. Generally, program modules may include: routines; programs; objects; components; logic; and data structures that perform particular tasks or implement particular abstract data types. Message parsing system 10 may be embodied in distributed cloud computing environments where tasks are performed by remote processing devices that are linked through a communications network. In a distributed cloud computing environment, program modules may be located in both local and remote computer system storage media including memory storage devices.

In embodiments, message parsing system 10 comprises: general purpose computer server 12 and one or more input devices 14 and output devices 16 directly attached to the computer server 12. Message parsing system 10 may be connected to a network 20. Message parsing system 10 may communicate with a user 18 using input devices 14 and output devices 16. Input devices 14 may include one or more of: a keyboard; a scanner; and a mouse, trackball or another pointing device. Output devices 16 may include one or more of a display or a printer. Message parsing system 10 may communicate with network devices (not shown) over network 20. Network 20 can be a local area network (LAN), a wide area network (WAN), or the Internet.

Computer server 12 comprises: central processing unit (CPU) 22; network adapter 24; device adapter 26; bus 28 and memory 30.

CPU 22 loads machine instructions from memory 30 and performs machine operations in response to the instructions. Such machine operations may include: incrementing or decrementing a value in a register; transferring a value from memory 30 to a register or vice versa; branching to a different location in memory if a condition is true or false (also referred to as a conditional branch instruction); and adding or subtracting the values in two different registers and loading the result in another register. A typical CPU can perform many different machine operations. A set of machine instructions is called a machine code program; the machine instructions are written in a machine code language which is referred to a low level language. A computer program written in a high level language is compiled to a machine code program before it can be run. Alternatively, a machine code program such as a virtual machine or an interpreter can interpret a high level language in terms of machine operations.

Network adapter 24 is connected to bus 28 and network 20 for enabling communication between the computer server 12 and network devices.

Device adapter 26 is connected to bus 28 and input devices 14 and output devices 16 for enabling communication between computer server 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures.

Memory 30 includes computer system readable media in the form of volatile memory 32 and non-volatile or persistent memory 34. Examples of volatile memory 32 are random access memory (RAM) 36 and cache memory 38. Examples of persistent memory 34 are read only memory (ROM) and erasable programmable read only memory (EPROM). Generally volatile memory is used because it is faster and generally non-volatile memory is used because it will hold the data for longer. Message parsing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The set of program modules configured to carry out the functions of the preferred embodiment comprises: messages 102; message models 104; message trees 106; message parser 108; and parser optimizer 200. In one embodiment, ROM in the memory 30 stores the program modules that enables the computer server 12 to function as a special purpose computer specific to the program modules. Further program modules that support the preferred embodiment but are not shown include firmware, boot strap program, operating system, and support applications. Each of the operating system; support applications; other program modules; and program data; or some combination thereof; may include an implementation of a networking environment.

Messages 102 arrive at the message parsing system from other computer systems in the network and are stored in persistent memory 34.

Message models 104 comprise one or more models for defining how a message can be broken down into message elements.

Message trees 106 comprise one or more message trees. Each message tree comprises structured message elements parsed from a message to a message model.

Message parser 108 is for breaking down a message into message elements for a message tree according to a message model. Parser optimizer 200 is for optimizing the process of message parser 108 and is described in more detail with respect to FIG. 2 below.

Message parsing system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with message parsing system 10. Examples, include, but are not limited to: microcode, device drivers, redundant processing units, external disk drive arrays, redundant array of independent disks (RAID), tape drives, and data archival storage systems.

Referring to FIG. 2, parsing optimizer 200 comprises the following components: background parser 202; element options fetcher 204; element option chooser 206; option parser 208; message tree populater 210; element option frequency updater 212; guide field value element option tables 214; enhanced message models 216; and parsing optimizer method 300.

In embodiments, parsing optimizer 200 is configured for parsing a message against a message model, the message model comprising a choice block of element options and a guide field for guiding the parse, parsing optimizer 200 comprising: a background parser 202 for parsing a message against a message model until a choice block of element options and an associated guide field is located in the message model; an element options fetcher 204 for determining element options associated with a guide field value located in the message, each element option having an associated frequency of occurring within a body of messages; an element option chooser 206 for choosing the most frequently occurring element option for the located guide field value; and an option parser 208 for further parsing the choice block of element options against the chosen element option.

Background parser 202 is configured for parsing a message normally using message parser 108 against a message model until a choice block of element options and an associated guide field is located.

Element options fetcher 204 is configured for etching element options associated with the located guide field value.

Element option chooser 206 is configured for choosing the element option with the highest frequency of being successfully parsed for that particular guide field value. Element option chooser 206 is further configured for removing a chosen element option from consideration if it is not successfully parsed against the message and for choosing the next most frequently occurring element option for that guide field value for further parsing. Element option chooser 206 looks externally to the message model for element option frequencies associated with the guide field value. Element option chooser 206 chooses element options in order of definition or in pseudo random order if there is no frequency of occurring associated with located guide field value. Element option chooser 206 chooses element options associated with the guide field value by looking up a data within the message model.

Option parser 208 is configured for parsing the choice block of element options against the chosen element option.

Message tree populater 210 is configured for populating a message tree for a successful element option parse.

Element option frequency updater 212 is configured for updating an element option frequency for a successfully parsed element option. In another embodiment, element option frequency updater 212 is configured for updating the associated frequency of occurrence for an unsuccessfully parsed element option.

Guide field value element option tables 214 comprise one or more guide field value element option tables 214. Each guide field element option table comprises, for a particular guide field value, a list of element options and corresponding frequency of occurrence.

Enhanced message models 216 comprise message models that are enhanced with one or more guide field values. Each message model comprises all element options that are available to that message model. In the preferred embodiment the grouping of element options for a particular guide field value and the frequency of occurrence of an element options are stored separately in guide field value element tables but in other embodiments this information can be stored in the enhanced message model. In one embodiment, the enhanced message model comprises a range of guide field values and the background parser is further for parsing a message against a message model until one of the range of guide field values is located in the message.

Parsing optimizer method 300 is configured for controlling the components of parser optimizer 200

Figure 3:
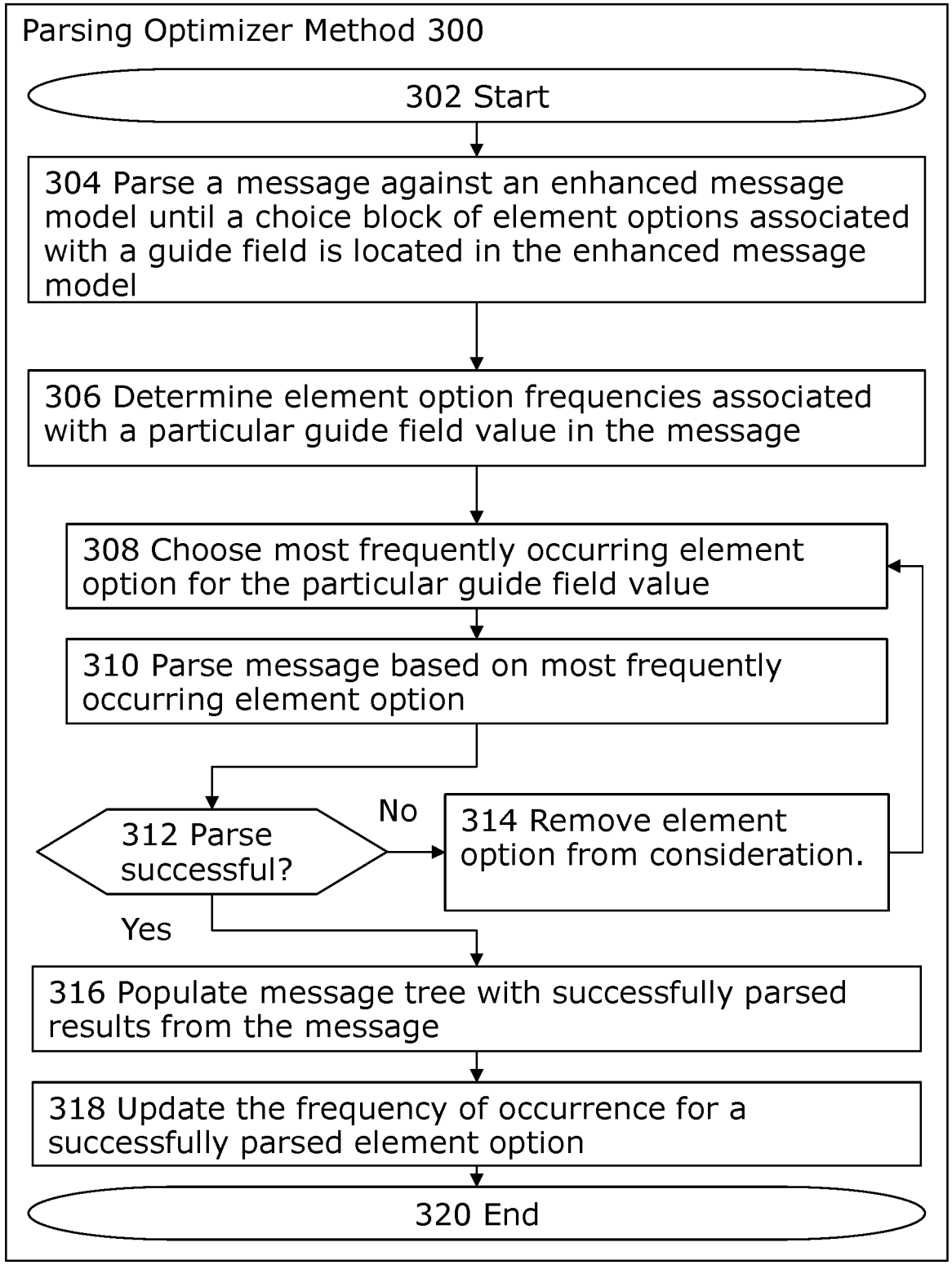
FIG. 3 is a flow diagram of a process in accordance with aspects of the invention.

Referring to FIG. 3, exemplary method 300 comprises logical process steps 302 to 320 for optimizing the parsing of a message.

Step 302 is the start of the method when a message is required to be parsed.

Step 304 includes parsing a message until a choice block of element options associated with a guide field is located in the enhanced message model. For example, if a choice block and guide field Y=7 is located then the method moves on to step 306. Another embodiment takes additional analytical and statistical steps to aggregate entries where a range or plurality or combination of potential values are found for a given guide field. A further embodiment identifies statistical similarities between guide field values and option elements, such as combining all possible guide fields beginning with the character "X" into an aggregated field and modifying the guide field checks from, for example, guide field="XY" and guide field="XZ" to a single guide field starting with "X".

Step 306 includes determining element option frequencies associated with a particular guide field value in the message. This is achieved, in the preferred embodiment, by looking up element options in a guide field element option table from the tables 214. Element choice probability comprises in the preferred embodiment the element choices and for each element choice, the number of times that the element choice has been chosen. In other embodiments associations can be made in the message model or a separate data structure linked with the message model. Frequency of previous occurrence is just one guide to the probability of a successfully parse and other probabilities can be used.

Step 308 includes choosing the most frequently occurring element option for that guide field value.

Step 310 includes parsing a message based on most frequently occurring element option.

Step 312 includes proceeding to step 316 if the parse is successful but proceeding to step 314 if not successful.

Step 314 includes removing the element option from consideration and looping back to step 308 for further choosing.

Step 316 includes populating a message tree with successfully parsed results from the message.

Step 318 includes updating element option frequency in the guide field element option table. An embodiment can use a rolling set of element option frequencies with regards to associated relative frequency of options to limit the number of entries stored and ensure that the logic is utilizing current workload characteristics that may potentially change over time.

Step 320 is the end of the method.

Referring to FIG. 4, an example message model of the preferred embodiment is described. The example model comprises 26 lines of program code.

Line 1 defines the name of the message model as Message01 and the start of the sequence of elements.

Lines 2 to 4 define three sequential elements of: string, integer and string that correspond to fields X, Y and Z.

Line 5 defines the start of a choice block (also referred to as an option definition) that the message model may encounter and includes an associated guide field definition set to field Y. Field Y is the second element in a message which should be an integer.

Lines 6 to 10 defines a first option as a complex element consisting of sequential elements (complexA): byte; string; double; string corresponding to fields: AA; AB; AC; and AD.

Lines 11 to 15 defines a second option as a complex element consisting of sequential elements (complexB): byte; string; string; string corresponding to fields: BA; BB; BC; and BD.

Lines 16 to 20 defines a third option as a complex element consisting of sequential elements (complexC): string; double; double; string corresponding to fields: CA; CB; CC; and CD.

Lines 21 to 25 defines a fourth option as a complex element consisting of sequential elements (complexD): byte; integer; byte; string corresponding to fields: DA; DB; DC; and DD.

Line 26 defines the end of the message model definition.

In the example of FIG. 4, the message model has been annotated with a property defining one or more fields that may help in determining which of the plurality of options is likely to successfully parse. In the example, there is a choice block with a plurality of choices and the guide field is stated as "fieldY"—defining field Y as the field for the run time to monitor and train itself on with regards to the order in which to attempt to parse the message data as each of the potential options.

The run time would parse fieldX, then fieldY, then fieldZ until the choice with associated guide field is reached, at which point the value obtained from parsing said guide field (fieldY) is referred to for aiding parsing the subsequent section of the message Referring to FIG. 5A, an example parse of a message (using the message model of FIG. 4) with corresponding element option tables is described with respect to example stages 5A1 to 5A6.

Stage 5A1 shows message A comprises: string; 7; string; string; double; double; string; and further information (not described). Message A is parsed conforming to the message model provided in FIG. 4 previously. A guide field value of 7 is located in the second element of the message corresponding to field Y by the parsing optimizer (line 3 and step 304).

Stage 5A2 shows a guide field option element table created because a table did not exist previously. When a look-up of the guide field value 7 is performed no data was located for the option elements for this value so a table was created for each option element listed in the message model (Complex A to D) (step 306).

Stage 5A3 states that all frequencies for all the options elements in the message model have been set to the same zero value (see table for stage 5A2).

Stage 5A4 describes how a parse cycle (steps 308, 310, 312, 314 and back to 308) takes three cycles (three loops), one for each of the options considered in sequence (complex A to C).

Stage 5A5 states that when complex C is successfully parsed, that the frequency value associated with complex X is incremented (step 318).

Stage 5A6 shows the guide field option element table for guide field y=7 having the frequency value for complex C increased by one.

Referring to FIG. 5B, an example parse of a message (using the message model of FIG. 4) and corresponding guide field element option tables are described with respect to example stages 5B1 to 5B6.

Stage 5B1 shows message B comprises: string; 7; string; string; double; double; string; and further information (not described and not relevant). Message B is parsed conforming to the message model provided in FIG. 4 previously and a guide field value of Y=7 is located in the second element of the message corresponding to field Y by the parsing optimizer (step 304).

Stage 5B2 shows a guide field option element table located when a look-up of the guide field value 7 is performed (step 306). Guide field option element table for guide field y=7 comprises option elements Complex A to D with associated frequencies. In the example, option element C has a frequency of 1 because option element C has been successfully parsed once for a message containing a guide field y equal to 7.

Stage 5B3 states that option element C has highest probability. This is because its associated frequency of occurrence is one more than any other option element (step 308).

Stage 5B4 parse takes 1 cycle for complex C to be successfully parsed (steps 308, 310, 312 and 316). There is no need to loop around for another cycle and another attempt to parse an element option.

Stage 5B5 states that complex C's frequency is incremented from 1 to 2 in the option element frequency table (step 318).

Stage 5B6 shows guide field option element table for guide field y=7 with an option element complex C frequency of 2.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:

1. A system for parsing a message against a message model, the system comprising:
    program instructions to parse a message against a message model until a choice block of element options is located in the message model, each element option having an associated frequency of occurrence in terms of the number of times the element option has previously occurred within a body of messages;
    program instructions to determine element options associated with a particular guide field value located in the message;
    program instructions to remove a chosen element option from consideration when it is not successfully parsed against the message;
    program instructions to choose the next most frequently occurring element option for that guide field value for further parsing; and program instructions to update the associated frequency of occurrence for an unsuccessfully parsed element option, wherein the program instructions are stored on the computer readable storage medium for execution by the processor via the computer readable memory.

2. The system according to claim 1 further comprising program instructions to identify statistical similarities between guide field values and the element options.

3. The system according to claim 1 further comprising program instructions of an element option frequency updater configured to update the associated frequency of occurrence for the successfully parsed element option.

4. The system according to claim 1 further comprising program instructions for an element option chooser which is configured to remove the chosen element option from consideration when it is not successfully parsed against the message, wherein the element option chooser is configured to choose the next most frequently occurring element option for that guide field value for further parsing.

5. The system according to claim 4 wherein the message model is annotated with a property defining one or more fields for determining which of the element options is likely to successfully parse.

6. The system according to claim 4 wherein the element option chooser looks externally to the message model for element option frequencies associated with the guide field value.

7. The system according to claim 4 wherein the element option chooser chooses element options in order of definition based on there being no element option frequency associated with located guide field value.

8. The system according to claim 4 wherein the element option chooser chooses element options in pseudo random order based on there being no frequency of occurring associated with located guide field value.

9. The system according to claim 4 wherein the element option chooser chooses element options associated with the guide field value by looking up a data within the message model.

10. The system according to claim 1 further comprising program instructions of a message tree populater configured to populate a message tree with successful parsed results from the message model and chosen element option.

11. A computer-implemented method for parsing a message against a message model, the message model comprising a choice block of element options and guide field for guiding the parse, the method comprising:

parsing, by a computer device, a message against a message model until a choice block of element options and an associated guide field is located in the message model;

determining, by the computer device, element options associated with a particular guide field value located in the message, each element option having an associated frequency of occurrence in terms of the number of times the element option has previously occurred within a body of messages;

looking to the message model for element option frequencies associated with the located guide field value;

choosing, by the computer device, the most frequently occurring element option for the located guide field value;

further parsing, by the computer device, the choice block of element options against the chosen element option;

updating the associated frequency of occurrence for a successfully parsed element option; and removing the chosen element option from consideration when it is not successfully parsed against the message and choosing a next most frequently occurring element option for further parsing.

12. The method according to claim 11 wherein the associated guide field value is a value in a range of associated guide field values.

13. The method according to claim 11 further comprising updating the associated frequency of occurrence for a successfully parsed element option.

14. The method according to claim 11 wherein the choosing the next most frequently occurring element option further parsing is for the particular guide field value.

15. The method according to claim 11 wherein the determining of the element options associated with a particular guide field value located in the message includes looking up element options in a guide field element option table.

16. The method according to claim 11 wherein the determining element options associated with the guide field value comprises a lookup external to the message model.

17. The method according to claim 11 further comprising choosing element options in order of definition based on there being no element option frequency associated with located guide field value.

18. The method according to claim 11 further comprising choosing element options in pseudo random order based on there being no frequency of occurring associated with located guide field value.

19. The method according to claim 11 wherein the determining element options associated with the guide field value comprises a lookup from a data structure within the message model.

20. A computer program product for parsing a message against a message model, the message model comprising a choice block of element options and guide field for guiding the parse, the computer program product comprising a computer readable storage medium having program instructions embodied therewith, the program instructions executable by a processor to cause the processor to:

parse a message against a message model until a choice block of element options and an associated guide field is located in the message model;

determine element options associated with a particular guide field value located in the message, each element option having an associated frequency of occurrence in terms of the number of times the element option has previously occurred within a body of messages;

look to the message model for element option frequencies associated with the located guide field value;

choose the most frequently occurring element option for the located guide field value;

further parse the choice block of element options against the chosen element option;

update the associated frequency of occurrence for a successfully parsed element option;

remove the chosen element option from consideration when it is not successfully parsed against the message; and update the associated frequency of occurrence for an unsuccessfully parsed element option.

* * * * *